(12) United States Patent
Wang

(10) Patent No.: US 9,817,451 B1
(45) Date of Patent: Nov. 14, 2017

(54) ELECTRONIC DEVICE WITH DETACHABLE DATA STORAGE DEVICE

(71) Applicant: MiiCs & Partners (Shenzhen) Co., Ltd., Shenzhen (CN)

(72) Inventor: Hung-Yuan Wang, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/183,775

(22) Filed: Jun. 15, 2016

(30) Foreign Application Priority Data

Apr. 26, 2016 (CN) .......................... 2016 1 0263152

(51) Int. Cl.
*G06F 1/18* (2006.01)

(52) U.S. Cl.
CPC .............. *G06F 1/185* (2013.01); *G06F 1/181* (2013.01); *G06F 1/184* (2013.01); *G06F 1/186* (2013.01)

(58) Field of Classification Search
CPC .......... G06F 1/185; G06F 1/184; G06F 1/186; G06F 1/181
See application file for complete search history.

(56) References Cited

U.S. PATENT DOCUMENTS

| | | | | |
|---|---|---|---|---|
| 5,673,172 A * | 9/1997 | Hastings | .............. | H05K 7/1418 361/679.34 |
| 6,233,142 B1 * | 5/2001 | Kerrigan | ................. | G06F 1/184 312/223.2 |
| 7,433,198 B2 * | 10/2008 | Fan | ......................... | G06F 1/181 361/679.01 |
| 8,035,960 B2 * | 10/2011 | Lin | ......................... | G11B 33/08 360/326 |
| 8,094,446 B2 * | 1/2012 | Liu | ........................ | G06F 1/187 361/679.33 |
| 8,432,684 B2 * | 4/2013 | Wu | ......................... | G06F 1/185 361/679.41 |
| 9,030,814 B2 * | 5/2015 | Tsai | ....................... | G11B 33/00 312/223.1 |
| 2006/0156930 A1 * | 7/2006 | Xing | ...................... | G06F 1/187 99/485 |
| 2008/0291618 A1 * | 11/2008 | Sheng | .................... | G11B 33/08 361/679.34 |
| 2009/0146030 A1 * | 6/2009 | Chen | ....................... | G06F 1/187 248/213.2 |
| 2009/0164685 A1 * | 6/2009 | Chen | ..................... | G06F 3/0607 710/301 |
| 2011/0075347 A1 * | 3/2011 | Liu | ........................ | G06F 1/187 361/679.33 |
| 2012/0026674 A1 * | 2/2012 | Aldridge | ................. | G06F 1/187 361/679.33 |
| 2012/0287570 A1 * | 11/2012 | Wu | ......................... | G06F 1/185 361/679.32 |
| 2013/0033814 A1 * | 2/2013 | Huang | .................. | G06F 1/1658 361/679.37 |
| 2013/0112633 A1 * | 5/2013 | Chen | ....................... | G06F 1/187 211/26 |
| 2015/0201520 A1 * | 7/2015 | Jau | ....................... | G11B 33/124 211/26 |

\* cited by examiner

*Primary Examiner* — Xanthia C Cunningham
(74) *Attorney, Agent, or Firm* — Steven Reiss

(57) ABSTRACT

An electronic device includes a chassis defining an opening. A motherboard is received in the chassis and a data storage device comprising a circuit board with storage unit can be directly coupled to the motherboard. The data storage device is mounted to the chassis through the opening but is detachable.

11 Claims, 4 Drawing Sheets

ELECTRONIC DEVICE WITH DETACHABLE DATA STORAGE DEVICE

FIELD

The subject matter herein generally relates to an electronic device with a detachable data storage device.

BACKGROUND

A plurality of PCIE slots are generally mounted to a circuit board of an electronic device, such as a computer and a server. The plurality of PCIE slots are configured to couple to a plurality of data storage devices, such as expansion cards, for storage expansion.

BRIEF DESCRIPTION OF THE DRAWINGS

Implementations of the present technology will now be described, by way of example only, with reference to the attached figures.

DETAILED DESCRIPTION

Figure 1:
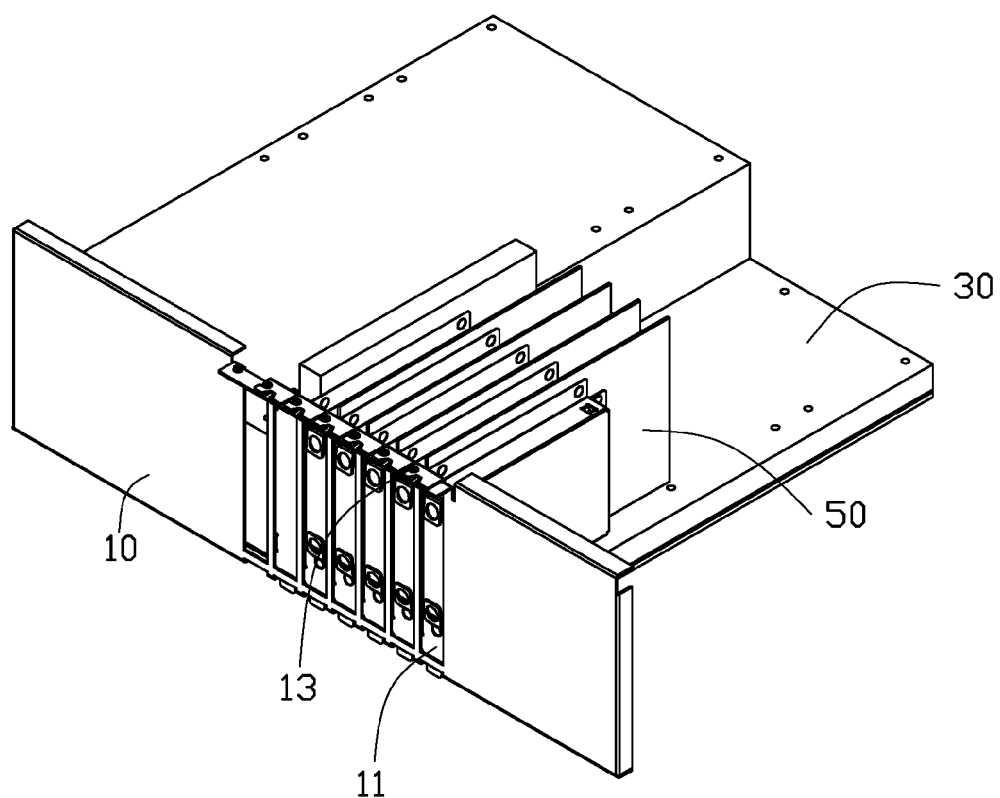
FIG. 1 is an assembled, isometric view of an embodiment of an electronic device with a plurality of data storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
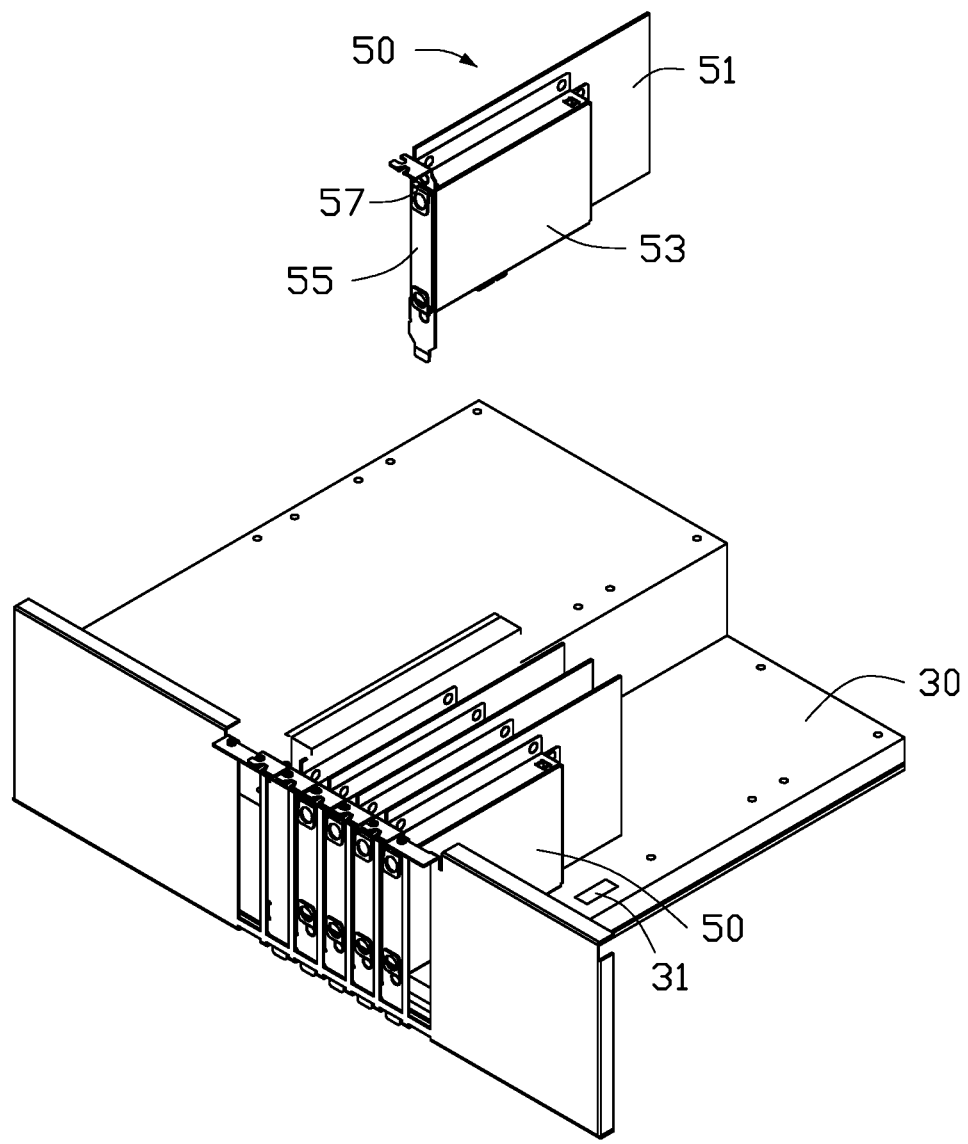
FIG. 2 is a partially exploded, isometric view of the electronic device of FIG. 1.

FIG. 1 and FIG. 2 illustrate an electronic device of an embodiment including a chassis 10, a motherboard 30 mounted in the chassis 10, and a plurality of side by side data storage devices 50 coupled to the motherboard 30.

The chassis 10 defines a plurality of openings 11 and includes a flange (not labeled) located above the openings 11. A plurality of positioning posts 13 extends from the flange. A plurality of positioning slots 20 is defined in the chassis 10 below the openings 11.

A plurality of coupling slots 31 are defined on the motherboard 30.

Figure 3:
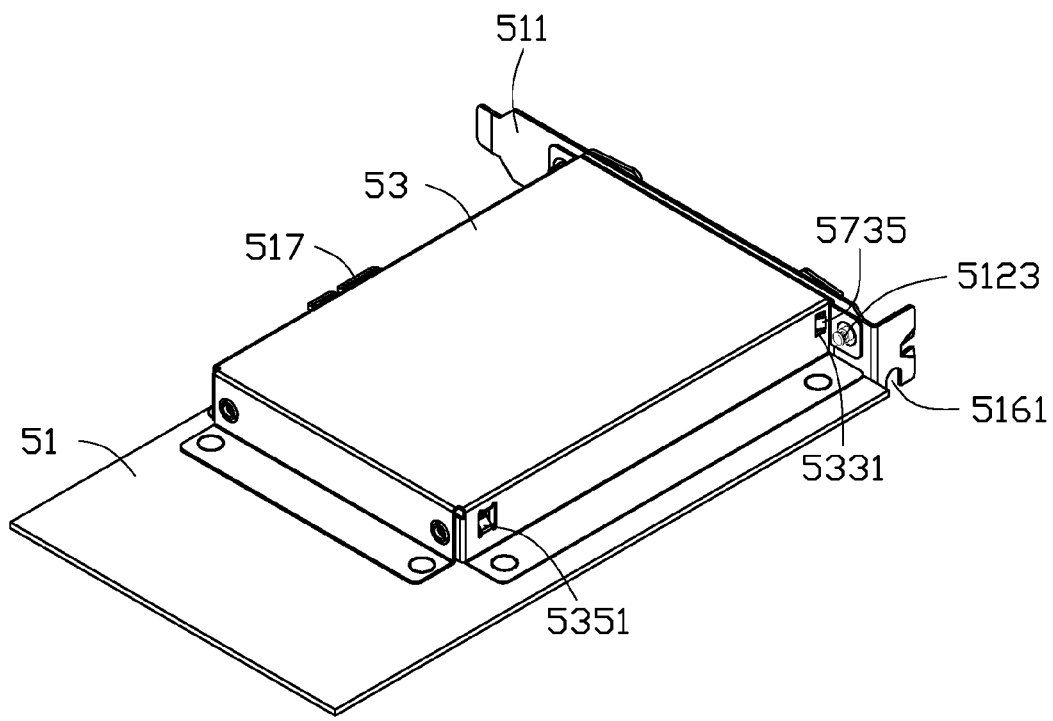
FIG. 3 is an assembled, isometric view of one of the plurality of data storage devices of FIG. 1.
Figure 4:
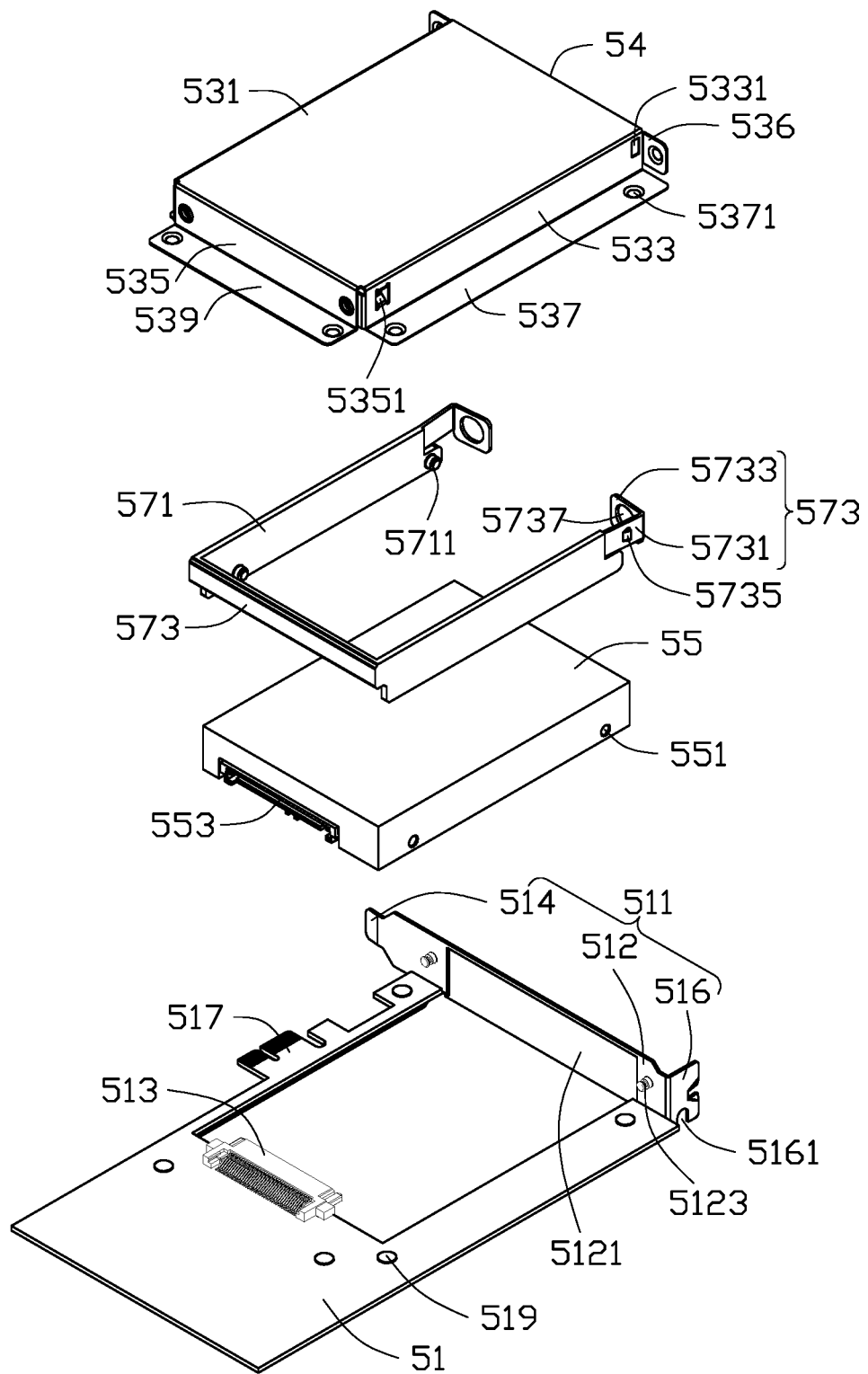
FIG. 4 is an exploded, isometric view of the data storage device of FIG. 3.

FIG. 3 and FIG. 4 illustrate that each data storage device 50 can include a circuit 51, a frame 53 engagable with the circuit 51, a storage unit 55, and a bracket 57.

A blocking piece 511 is connected to a front end of the circuit board 51 and can include a base piece 512, an extension 514 extending from a first end of the base piece 512, and a latching piece 516 extending from a second end of the base piece 512. In at least one embodiment, the latching piece 516 is substantially perpendicular to the base piece 512. The base piece 512 defines a slot 5121. Two latching posts 5123 extend from the base piece 512 and are located at opposite sides of the slot 5121. The latching piece 516 defines a cutout 5161. A connector 513 is secured to the circuit board 51. A coupling end 517 is located in an end of the circuit board 51 adjacent to the positioning piece 514. The circuit board 51 further defines a plurality of locking holes 519.

The frame 53 can include a top plate 531, two side plates 533 connected to the top plate 531, and a front plate 535 perpendicularly connected to the top plate 531 and the two side plates 533. A first mounting plate 537 perpendicularly extends outwards from a bottom edge of each side plate 533. A second mounting plate 539 perpendicularly extends outwards from a bottom edge of the front plate 535. A tab 536 perpendicularly extends outwards from a side edge of each side plate 533. Each of the first mounting plate 537, the second mounting plate 539, and the tab 536 defines at least one through hole 5371. Each side plate 533 defines a latching hole 5331 adjacent to the tab 536. A block 5351 extends from each side plate 533 adjacent to the front plate 535. The frame 53 defines an opening 54 opposite to the front plate 535.

Each side surface of the storage unit 55 defines two installation holes 551. A connecting plug 553 is secured to a bottom end of the storage unit 55.

The bracket 57 can include two sidewalls 571, a front wall 575 connected between the two sidewalls 571, and a latching member 573 connected to each sidewall 571. Each latching member 573 can include a connecting piece 5731 extending from the sidewall 571, a securing tab 5733 perpendicularly extending from the connecting piece 5731, and a latching block 5735 extending from the connecting piece 5731 away from the securing tab 5733. Each connecting piece is elastically deformable. Each securing tab 5733 defines a securing hole 5737. Two protrusions 5711 extend from an inner surface of each sidewall 571. Each protrusion 5711 is elastically deformable.

FIG. 3 illustrates that in assembly of the data storage device 50, the frame 53 is moved to align the through holes 5371 to the locking holes 519 and the latching posts 5123. The latching posts 5123 are locked into the through holes 5371 of the tab 536. A plurality of fasteners (not shown) are secured into the locking holes 519 via the through holes 5371 of the first mounting piece 537 and the second mounting piece 539. The opening 51 is aligned to the slot 5121. The frame 53 is secured to the circuit board 51.

The storage unit 55 is moved between the two sidewalls 571 and the protrusions 5711 can elastically deform to engage in the installation holes 551 to secure the storage unit 55 in the bracket 57. The bracket 57 is pushed into the slot 5121 towards the connector 513 until the coupling plug 553 is coupled to the connector 513. In this position, the latching block 5735 is engaged in the latching hole 5331 and the block 5351 elastically resists the storage unit 55.

FIG. 4 illustrates that in assembly of the electronic device, each data storage device 50 is moved to align the positioning piece 514 to the positioning slot 20. The cutout 5161 is aligned to the positioning post 13 and the coupling end 517 is aligned to the coupling slot 31. The data storage device 50 is moved towards the motherboard 30 until the positioning piece 514 is engaged in the positioning slot 20. The positioning post 13 is engaged in the cutout 5161 and the coupling end 517 is coupled to the coupling slot 31.

In disassembly of the storage unit 55 from the chassis 10, the two securing tabs 5733 are pressed inwards to disengage the latching block 5735 from the latching hole 5331, enabling the bracket 57 to be pulled out of the chassis 10. The securing hole 5737 is configured for operating the securing tab more conveniently.

The embodiments shown and described above are only examples. Many details are often found in the art such as the other features of an electronic device with detachable display. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device comprising:
   a chassis defining an opening;
   a motherboard received in the chassis; and
   a data storage device comprising a circuit board coupled to the motherboard, a frame secure to the circuit board, a bracket, and a storage unit secured to the bracket;
   wherein the frame comprises two side plates each defines a latching hole, and the blocking block is engaged in the latching hole, the bracket comprises two sidewalls, a front wall connected between the two sidewalls, two latching members each extending from one of the two sidewalls, and a protrusion extending from each sidewall, the two latching members are elastically mounted to the frame, each latching member comprises a connecting piece extending from the sidewall and a latching block extending from the connecting piece, each side surface of the storage unit defines an installation hole, and the protrusion is elastically deformable and engaged in the installation hole, the storage unit is detachablely mounted to the chassis through the opening.

2. The electronic device of claim 1, wherein the connecting piece is elastically deformable.

3. The electronic device of claim 1, wherein the frame further comprises a block extending from the side plate, and the block elastically resists the storage unit.

4. The electronic device of claim 1, wherein the frame further comprises a mounting plate perpendicularly extending from a bottom edge of the side plate, and the side plate is secured to the circuit board.

5. The electronic device of claim 1, wherein the circuit board comprises a blocking piece secured to the opening and a connector, the blocking piece defines a slot, the storage unit comprises a connecting plug, the bracket is movable relative to the circuit board along the slot to couple the connecting plug to the connector.

6. An electronic device comprising:
   a chassis defining an opening;
   a motherboard received in the chassis; and
   a data storage device comprising a circuit board coupled to the motherboard, a frame secured to the circuit board, a bracket, and a storage unit secured to the bracket;
   wherein the bracket comprising two sidewalls, a front wall connected between the two sidewalls, two latching members each extending from one of the two sidewalls, and a protrusion extending from each sidewall, each side surface of the storage unit defines an installation hole, and the protrusion is elastically deformable and engaged in the installation hole and the two latching members are elastically mounted to the frame, each latching member comprises a connecting piece extending from the sidewall and a latching block extending from the connecting piece, the frame comprises two side plates each defines a latching hole, and the blocking block is engaged in the latching hole, the bracket is detachablely mounted to the frame together with the storage unit.

7. The electronic device of claim 6, wherein the connecting piece is elastically deformable.

8. The electronic device of claim 6, wherein the frame further comprises a block extending from the side plate, and the block elastically resists the storage unit.

9. The electronic device of claim 6, wherein the frame further comprises a mounting plate perpendicularly extending from a bottom edge of the side plate, and the side plate is secured to the circuit board.

10. The electronic device of claim 6, wherein the circuit board comprises a blocking piece secured to the opening and a connector, the blocking piece defines a slot, the storage unit comprises a connecting plug, the bracket is movable relative to the circuit board along the slot to couple the connecting plug to the connector.

11. The electronic device of claim 6, wherein the blocking piece comprises a latching post, the frame further comprises a tab extending from a side edge of the side plate, and the latching post is engaged with the tab.

* * * * *